(No Model.)
S. A. JELLETT.
CALIPERS.
No. 311,248. Patented Jan. 27, 1885.
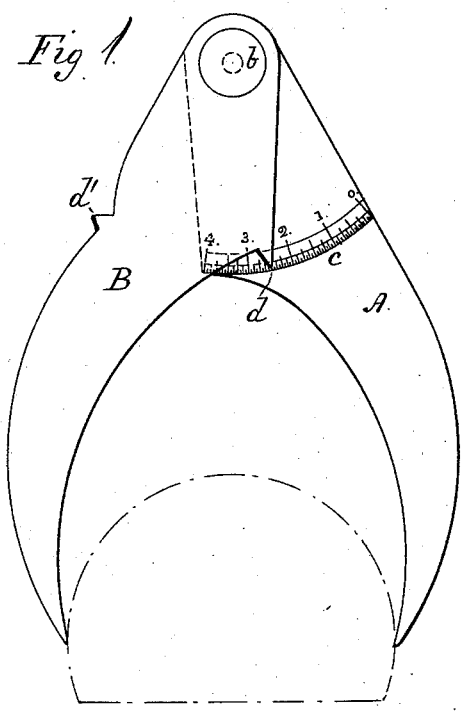
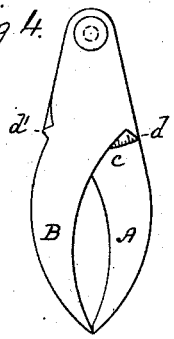
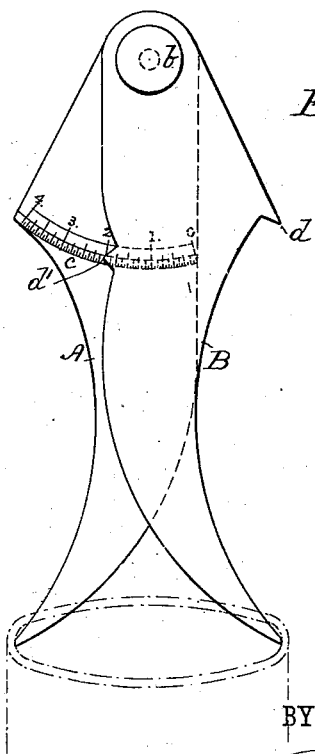
WITNESSES:
John Cook
C. Sedgwick
INVENTOR:
S. A. Jellett
BY Munn & Co
ATTORNEYS.

UNITED STATES PATENT OFFICE.

STEWART A. JELLETT, OF PHILADELPHIA, PENNSYLVANIA.

CALIPERS.

SPECIFICATION forming part of Letters Patent No. 311,248, dated January 27, 1885.

Application filed August 13, 1884. (No model.)

*To all whom it may concern:*

Be it known that I, STEWART A. JELLETT, of Germantown, Philadelphia, Philadelphia county, and State of Pennsylvania, have invented new and useful Improvements in Calipers, of which the following is a full, clear, and exact description.

This invention relates to calipers having but one pair of legs for making both inside and outside measurements, and provided with a scale for indicating the measurement. It essentially differs from other measuring-calipers, in which the scale or duplicate scales are arranged upon appendages to or on long projections from the legs of the calipers. In my improved measuring-calipers the scale is marked upon the face of the one leg where or nearly where the same is usually made widest, and, not forming an objectionable protrusion, is prevented from getting out of order, while the other leg is formed or provided with indicating-pointers so arranged that when the calipers are closed to carry in the pocket said pointers are protected from being broken off and from catching in or tearing the pocket. Said calipers may accordingly be safely and conveniently carried in the pocket without a case or sheath, and will occupy no more space than an ordinary pair of calipers, and the same has no more parts or pieces, nor does the improvement materially increase the cost of the calipers.

Reference is to be had to the accompanying drawings, forming part of this specification, in which similar letters of reference indicate corresponding parts in all the figures.

Figure 1 represents a side view of a pair of calipers embodying my invention, and as adjusted for measuring round shafting or for other outside measurement. Fig. 2 is an edge view of the same. Fig. 3 is a further face or side view of the calipers when adjusted into position for measuring inside work—such as boxes for shafting, collars, &c.; and Fig. 4, a side view upon a smaller scale of the calipers closed.

A indicates the one leg or arm of the calipers, and B the other leg or arm thereof, jointed, pivoted, or riveted together, the one upon the other, as at *b*. Said legs may be of the same general configuration as the like parts of other calipers, and should be made of thin metal, to allow them to spring and pass by each other for the purpose of taking inside measurements.

Upon the face of the one leg, A, at a suitable distance from the pivot or joint, and at or near where said leg is widest, is cut or stamped a suitably-divided scale, *c*. At or near the same distance from the pivot or joint *b* the other leg, B, is constructed on its opposite edges to form two small pointers, *d d'*, which as the legs are moved travel over the scale *c*. These pointers, which are integral portions of the leg B, may be produced by or during the shaping of said leg, and should be of such size and so fashioned that when the calipers are closed, as represented in Fig. 4—that is, their bowed outer ends made to touch—said pointers will lie within or not exceed the width of the part of the leg A over which they travel when in motion, whereby said pointers will be protected from being broken off or from catching or tearing when carried in the pocket.

When using the calipers for outside measurements, as shown in Fig. 1, the pointer *d* serves to indicate on the scale *c* the exact measurement, and when using the calipers for inside measurements, as shown in Fig. 3, the pointer *d'* indicates the measurement on the scale. Thus the same scale answers for both inside and outside measurements.

The measuring-calipers thus constructed are both simple and durable, and will be found very convenient to machinists, millwrights, and others whose business takes them among machinery in motion. Thus a machinist perched upon a ladder in proximity to a shaft may hold on with the one hand, while with the other hand he passes the calipers across the shaft, and looking at the scale sees the exact size without having to resort to a rule. An inside measurement under similar circumstances may be made with like facility, and it is by the construction of the calipers, as described, that these facilities are obtained without any material alteration to the shape of the calipers, addition to their weight, size, number of parts, or, at least not appreciably so, to their cost, besides being durable and not liable to get out of order.

Having thus described my invention, what I claim as new, and desire to have secured by Letters Patent, is—

The combination, with the pivoted legs A B, of the scale $c$ on the one leg, and the pointers $d\ d'$ on the opposite edges of the other leg, the whole being constructed and arranged to permit of the computation on the same scale by said pointers, respectively, either an outside or inside measurement, and said pointers $d\ d'$ being constructed and arranged so that when the calipers are closed they will not project beyond the edges of the leg on which the scale is arranged, substantially as specified.

STEWART A. JELLETT.

Witnesses:
O. N. MIDDLETON,
EDWIN C. JELLETT.